United States Patent [19]
Parkyn

[11] 3,801,925
[45] Apr. 2, 1974

[54] FREQUENCY SYNCHRONISERS

[75] Inventor: John Michael Parkyn, St. Albans, England

[73] Assignee: Marconi Instruments Limited, Chelmsford, Essex, England

[22] Filed: Sept. 6, 1972

[21] Appl. No.: 286,536

[30] Foreign Application Priority Data

Sept. 10, 1971 Great Britain .................... 42265/71

[52] U.S. Cl. ........................ 331/1 A, 331/16, 331/64
[51] Int. Cl. ............................................... H03b 3/08
[58] Field of Search ................ 331/1 A, 16, 3, 4, 64

[56] References Cited

UNITED STATES PATENTS

| | | | |
|---|---|---|---|
| 2,808,509 | 10/1957 | Felch et al. | 331/64 |
| 3,398,377 | 8/1968 | Hill | 331/16 |
| 3,676,794 | 7/1972 | Bidell | 331/1 A |
| 3,688,212 | 8/1972 | Hugenholtz | 331/4 |

*Primary Examiner*—John Kominski
*Attorney, Agent, or Firm*—Baldwin, Wight & Brown

[57] ABSTRACT

A frequency synchroniser is used to improve the accuracy of a signal generator. The synchroniser has its own reference oscillator from which is obtained a signal which is compared at a phase sensitive detector with a signal derived from the signal generator by a frequency division. An indication is provided as to whether or not the signal derived from the signal generator has been divided by the correct factor.

6 Claims, 1 Drawing Figure

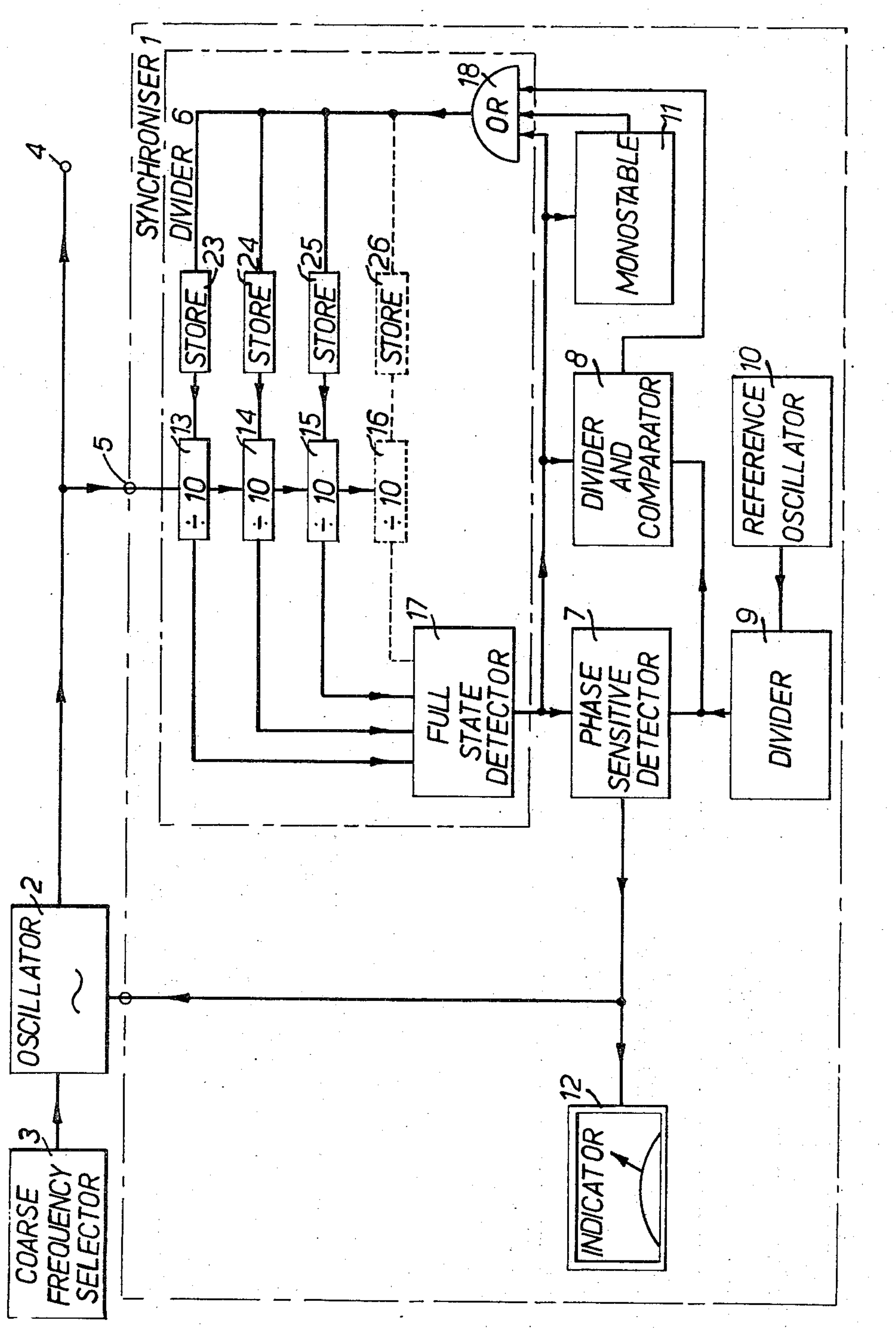
SYNCHRONISER
DIVIDER
STORE
STORE
STORE
STORE
÷ 10
÷ 10
÷ 10
÷ 10
OR
MONOSTABLE
DIVIDER AND COMPARATOR
REFERENCE OSCILLATOR
FULL STATE DETECTOR
PHASE SENSITIVE DETECTOR
DIVIDER
OSCILLATOR
COARSE FREQUENCY SELECTOR
INDICATOR

FREQUENCY SYNCHRONISERS

This invention relates to frequency synchronisers and particularly to frequency synchronisers of the kind which are suitable for use with a signal generator having a free running oscillator whose frequency of oscillation is controllable to a first order of accuracy by manual tuning and whose frequency of oscillation can be finely adjusted by means of an electrical signal applied thereto. As is known, by means of a frequency synchroniser the output frequency obtainable from a signal generator can be controlled to within limits more closely defined than can be obtained by manually tuning alone.

Frequency synchronisers which are capable of providing an electrical control signal which is usuable by a signal generator of this kind often rely for their operation on the comparison of a frequency derived from the output of the signal generator with a standard frequency, it being arranged that this derived frequency is in a predetermined integral ratio with the standard frequency. A difficulty which arises is that comparison can be inadvertantly effected with a derived frequency which is in an incorrect integral ratio with the standard frequency. This causes an incorrect output frequency to be provided and the expedient of providing a separate frequency counter to check the correctness of the output frequency is clearly unsatisfactory, particularly since accurate frequency counters tend to be very expensive. The present invention seeks to provide improved frequency synchronisers in which the aforementioned difficulty is reduced.

According to this invention a frequency synchroniser includes means for receiving a frequency to be synchronised to a predetermined value, means for comparing a frequency derived from said received frequency with a standard frequency to effect synchronisation of the said received frequency, means for detecting when the said derived frequency and the said standard frequency are in an incorrect ratio and means for indicating to an operator the existance of this incorrect ratio.

Preferably the said received frequency is frequency divided by means of a resettable divider to provide the said derived frequency such that when synchronisation is achieved the frequency derived by division is in a predetermined ratio with the said standard frequency.

Preferably again the means for detecting the said incorrect frequency ratio comprises a further comparison means to which both the standard frequency and the derived frequency are applied, said further comparison means including means, for resetting the said resettable divider when an incorrect ratio is detected.

Preferably first said means for comparing the frequency derived from said received frequency with the standard frequency comprises a phase sensitive detector of kind which provides a predetermined d.c. output voltage when the frequencies applied to it are in the predetermined ratio.

Preferably again the output voltage of the phase sensitive detector is applied to an indicator from which it is ascertainable whether the received frequency is synchronised to its desired value.

The invention is particularly applicable to signal generators which are manually tunable to a desired frequency by means of a coarse frequency selector. Because frequency measurement requirements have become progressively more stringent, the frequency tuning facilities are often not sufficiently accurate or sensitive to enable current standards of accuracy to be satisfied. Signal generators of the kind to which the present invention is applicable are provided with an electrical connection by means of which the frequency of oscillation can be altered for trimming purposes over a small range, say 1 percent of the total tunable range, by applying an electrical signal to the connection. Invariably it is necessary to apply a d.c. voltage whose level determines the degree of "trimming" or change in frequency.

The present invention will be further described by way of example with reference to the accompanying drawing which shows diagrammatically one embodiment of a frequency synchroniser in accordance with the present invention.

Referring to the drawing there is shown therein a frequency synchroniser enclosed within the chain-line box 1 and those parts of a signal generator necessary for an understanding of the present invention. These parts consist of an oscillator 2 and a coarse frequency selector 3. The output signal of the oscillator 2 is connected to an output terminal 4, and also to the frequency synchroniser 1 via terminal 5. The frequency synchroniser 1 includes a frequency divider 6, shown within the chain-line box, the input of which is connected to terminal 5, and the output of which is connected to one of two inputs of a phase sensitive detector 7. The other input of the phase sensitive detector 7 is connected to one input of a divider and comparator 8 and also via a divider 9 to a reference oscillator 10. The output terminal of the divider 6 is also connected to another input of the divider and comparator 8 and to a monostable 11. The output of the phase sensitive detector 7 is connected to an indicator 12 and to the oscillator 2.

The divider 6 includes a series of decade dividers 13, 14, 15 . . . 16, each being associated with a store 23, 24, 25 . . . 26. The output of each of the decade dividers is connected to a full state detector 17 the output of which constitutes the output of divider 6 as a whole. Each of the stores 23, 24, 25 . . . 26 is provided with a connection to the output of an OR gate 18 having three input terminals, the first of which is connected to the full state detector 17, the second of which is connected to the monostable 11 and the third of which is connected to the divider and comparator 8.

The operation of the circuit is as follows. A desired output frequency is manually selected by means of the coarse frequency selector 3 which determines the approximate frequency of oscillation of the oscillator 2. The output of the oscillator 2 is applied to the frequency divider 6 where its frequency is precisely divided by a divisor which is chosen by setting the contents of the stores 23, 24, 25 . . . 26. In general if a particular decade of the frequency divider 6 is to divide by $n$, the associated store is set to $9 - n$. Each decade divider 13, 14, 15 . . . 16 consists of a ten bit counter, and when each counter fills up a signal is passed to the full state detector 17 which is effectively an AND gate, and provides an output when all of the counters of the decade dividers are full. At the same time the stores 23, 24, 25 . . . 26 are reset via OR gate 18 and the division process is repeated. Typically it is arranged that the division process is such that a frequency of 100 Hz is received at the output of the frequency divider 6. This frequency is applied to the phase sensitive detector 7. The reference oscillator 10, typically having a frequency of 50 Hz, is applied to the frequency divider 9 which in the example under consideration provides a fixed division factor of 5, such that a frequency of 10 Hz is applied to the phase sensitive detector.

The phase sensitive detector 7 is of the kind well known which provides a steady d.c. output voltage when the two input signals applied to it are in a particular constant ratio. The ratio used here is 10:1, i.e. 100 Hz from the divider 6 and 10 Hz from the divider 9. The steady d.c. output voltage is used to provide fine tuning for the oscillator 2, and to compensate for drift therein. The oscillator 2 is usually only tunable by means of the fine tuning d.c. voltage over a very limited range, typically 1 percent, and consequently if the coarse frequency selector 3 is not initially set with sufficient accuracy, the synchroniser 1 may be unable to pull-in the oscillator frequency to the correct value. In this case some frequency other than 100 Hz will be provided at the output of the divider 6, and if it is sufficiently close to an integral multiple of the divided frequency provided by divider 9, a d.c. output voltage will be provided by the phase sensitive detector 7 and the frequency of oscillation provided by the signal generator locks onto an incorrect value.

However to prevent this possibility occurring divider and comparator 8 is provided, which in effect divides the frequency provided by divider 6 by the ratio which it should bear relative to the frequency at the output of divider 9, and compares the resultant. If the resultant frequencies are not equal an output signal is passed to OR gate 18 which resets the stores 23 etc. This prevents the phase sensitive detector providing a d.c. output voltage. Instead a fluctuating signal is provided which can be observed on the indicator 12. It is then necessary for the operator to manually readjust the coarse frequency selector 3 until the steady d.c. output signal is observed on the indicator.

If the coarse frequency selector 3 is inadvertently set to a frequency very much less than that selected by the stores 23, 24, 25 . . . 26 of the divider 6, the counters associated with the decade dividers 13, 14, 15 . . . 16 fill very slowly, and a very long period elapses before a pulse is provided at the output of the full state detector 17. To avoid this long delay before stores 23, 24 25 . . . 26 are reset, the monostable 11 is arranged to have a timing delay of duration slightly longer than the interval between pulses applied to it when the circuit is working correctly. Consequently if the frequency supplied by the divider 6 is less than the correct one monostable 11 resets the stores 23, 24, 25 . . . 26 with a minimum delay. The effect of this repeated resetting is a fluctuation at the indicator 12.

It will thus be appreciated that the correct indication is displayed by the indicator 12 only when the output frequency provided at terminal 4 of the signal generator is the same as that selected by the setting of the stores 23, 24, 25 . . . 26.

I claim:

1. In a frequency synchroniser, the combination of:

means for receiving a frequency to be synchronised;

reference frequency generator means;

resettable divider means for dividing the frequency to be synchronised by a selected factor, said divider means having a reset input connected with its divided frequency output;

comparator means for comparing the output of the resettable divider means with a signal derived from the reference frequency generator means;

indicator means for indicating when the frequency compared in the comparator means differ from one another; and a timing circuit connected to said reset input for resetting the resettable divider means when a predetermined time lapses without there being produced a signal at the output of said resettable divider means.

2. A frequency synchroniser as claimed in claim 1 including a further comparison means to which both the standard frequency and the derived frequency are applied, said further comparison means including means, for resetting the said resettable divider when an incorrect ratio is detected.

3. A frequency synchroniser as claimed in claim 1 wherein said comparator comprises a phase sensitive detector of kind which provides a predetermined d.c. output voltage when the frequencies applied to it are in the predetermined ratio.

4. A frequency synchronizer system comprising, in combination:

adjustable frequency generating means having a manual coarse frequency selection input and an electrical fine tuning input for producing an output signal which is intended to be of a selected frequency;

divider means connected to the output of said adjustable frequency generating means for dividing down the output signal thereof by a selected factor *n*, said divider means including counter means having a resettable input for initiating successive frequency dividing counts;

reference frequency generating means for generating a reference frequency signal harmonically related to said selected frequency;

phase detector means connected to the outputs of said divider means and of said reference frequency generating means for producing a control signal proportional to the difference between such outputs, said control signal being connected to said fine tuning input of said adjustable frequency generating means for fine tuning the latter within the limits of fine tuning thereof;

indicator means connected to the control signal output of the phase detector means for providing an operator with an indication of variation which may occur in said control signal;

multiple-input gate means having one input thereof constituted by the output of said divider means for resetting said counter means in synchronism with the output of said divider means; and means providing a further input to said gate means which is out of synchronism with the input from said divider means when the output of said divider means differs from said reference frequency signal ay an amount exceeding said limits of the fine tuning, whereby to cause fluctuations of the indicated control signal.

5. A frequency synchronizer system as defined in claim 4 wherein the means last mentioned includes a pulse generating means connected to the output of said divider means for producing a pulse output delayed in time from said output of the divider means by an amount slightly longer than the period of said selected frequency.

6. A frequency synchronizer system comprising, in combination:

an oscillator having a coarse manual adjustment for manually setting the oscillator approximately to produce an output of a selected frequency and having an electrical fine tuning input whereby the manually adjusted output of the oscillator may be tuned toward said selected frequency within narrow limits;

resettable counter means for dividing down the output of said oscillator by a predetermined factor to produce a first signal harmonically related to said output of the oscillator, means for comparing said first signal with a reference signal related to said selected frequency for providing said electrical fine tuning input;

a visual indicator connected to said fine tuning input to display fluctuations of such input which would be indication of a coarse setting of the oscillator which is outside said limits of fine tuning thereof;

said first signal being connected to the resettable counter means for resetting same upon occurrence of said first signal; and means for resetting said counter means out of synchronism with said first signal output of the resettable divider means when said coarse setting of the oscillator is outside said limits of fine tuning whereby to cause fluctuations in said fine tuning input for display by said indicator correspondingly to apprise an operator that further manual setting is required in order to produce said selected frequency output from the oscillator.

* * * * *